United States Patent

Nunes et al.

Patent Number: 5,730,077
Date of Patent: Mar. 24, 1998

[54] RUBRAIL WITH SELF-CONTAINED STIFFENER

[75] Inventors: John D. Nunes, Lakeville; David M. Phaneuf, East Bridgewater, both of Mass.

[73] Assignee: Barbour Corporation, Brockton, Mass.

[21] Appl. No.: 628,559

[22] Filed: Apr. 10, 1996

[51] Int. Cl.[6] ............................................. B63B 59/02
[52] U.S. Cl. ................................... 114/219; 114/357
[58] Field of Search ................................ 114/219, 357; 293/102, 126, 136; 267/140; 405/212

[56] References Cited

U.S. PATENT DOCUMENTS

| | | | |
|---|---|---|---|
| 3,123,909 | 3/1964 | Dorst . | |
| 3,449,917 | 6/1969 | Roskopf . | |
| 3,606,431 | 9/1971 | Kunevicius | 114/219 |
| 4,084,533 | 4/1978 | Boyer | 114/219 |
| 4,292,913 | 10/1981 | Siebert et al. | 114/219 |
| 4,428,568 | 1/1984 | McNatt et al. | 267/140 |
| 4,563,381 | 1/1986 | Woodland | 428/156 |
| 4,721,414 | 1/1988 | Akiyama | 114/219 |
| 4,776,928 | 10/1988 | Perlich | 204/12 |
| 4,810,550 | 3/1989 | Gasser | 428/100 |
| 4,860,495 | 8/1989 | Kessler | 49/498 |
| 5,095,840 | 3/1992 | Kramer | 114/219 |
| 5,145,082 | 9/1992 | Craft, Jr. et al. | 220/755 |

*Primary Examiner*—Stephen Avila
*Attorney, Agent, or Firm*—Weingarten, Schurgin, Gagnebin & Hayes LLP

[57] ABSTRACT

An integral dual durometer rubrail for protecting a boat gunwale including a base portion of a first hardness and having a bottom surface and a top surface, and a first body portion of a second hardness affixed to a portion of the base portion top surface.

8 Claims, 4 Drawing Sheets

5,730,077

1

RUBRAIL WITH SELF-CONTAINED STIFFENER

FIELD OF THE INVENTION

This invention relates generally to extrusions, and more particularly to moldings known as rubrails.

BACKGROUND OF THE INVENTION

Rubrails most commonly in use today are extrusions from either aluminum, rigid vinyl, or flexible vinyl. Both the aluminum and the rigid vinyl rubrails lay very straight when installed on a boat gunwale and generally do not show distortions or pucker marks due to fastener pressure. This is an aesthetically desirable feature of these classes of rubrail. However, installation is a complex, costly, and time-consuming undertaking since in order to bend the rail around corners or sharp curves, the stiff rubrail must be softened by the application of heat. Therefore, due to the ease of installation and cost reduction, many manufacturers prefer flexible PVC rubrails.

Several types of flexible rubrails are currently commercially available such as a solid flexible rubrail where fasteners bear on the outer surface of the extrusion, a flexible rubrail having an elongated region where a rope or flexible tubing may be inserted, and a flexible rubrail having a channel in which a rigid stiffener is inserted. There are several disadvantages with the above described flexible rubrails. For example, an obvious waviness in the rubrail surface is present after installation of the flexible rubrail. Another disadvantage is that the flexible rubrail is prone to periodic bulging caused by pressure exerted by fasteners used to attach the rubrail to the gunwale.

FIG. 1 (prior art) shows an exemplary unsatisfactory attempt to minimize the above drawbacks with a rubrail 10 whose body 12 is flexible, but which has a strip 14 of rigid PVC (or in some cases aluminum) inserted into a channel 16 in the body of the rubrail as a stiffener. However, to fabricate a flexible rubrail 10 with an inserted stiffener 14, two separate extrusions must be produced, thus increasing the cost of the basic flexible rail. Also, careful handling of the rubrail is necessary so that the stiffener does not fall out. Another problem is that in order to insert the stiffener, some clearance must be provided between the surface 18 the stiffener 14 and the inner surface 20 of the rubrail channel 16 causing the stiffener to be loose and not solidly connected to the body 12. This allows some movement of the stiffener 14 within the channel 16 which lessens the efficiency of the stiffener resulting in some waviness in the rubrail 10 still being present after installation. Furthermore, a portion into which the stiffener is cradled can distort such that the stiffener can become dislodged. Also, addition of the stiffener requires that the rubrail be of higher profile than a rubrail without a stiffener, which is sometimes contrary to the look a stylist may wish to create. Further, the stiffener may reduce fastener bulges, but does not totally eliminate them.

SUMMARY OF THE INVENTION

The present invention, a dual durometer rubrail, provides superior impact protection and aesthetic benefits, yet is easy to manufacture, handle, and install. In a first embodiment, the rubrail comprises a base portion having a first hardness, a bottom surface and a top surface, and a first bodyportion having a second hardness affixed to a portion of the base portion top surface.

2

The dual durometer rubrail is manufactured by melting a first plastic material having a first hardness into a molten state, melting a second plastic material having a second hardness, merging the first and second materials while in the molten state thereby fusing the first and second materials together, extruding the first and second materials through a die to shape the rubrail, immersing the extruded rubrail in a cooled liquid to cool the rubrail, and pulling the chilled rubrail away from the die at a constant speed.

BRIEF DESCRIPTION OF THE DRAWINGS

Other features and advantages of the invention will be apparent from the following detailed description of the invention in conjunction with the accompanying drawings, in which.

DETAILED DESCRIPTION OF THE INVENTION

FIGS. 2-4B illustrate a dual durometer rubrail 100 for use in the boating industry to provide protection and aesthetic appeal to various vessels. The rubrail 100 includes a relatively stiff base portion 102 having a first hardness and a first body portion 104 having a second hardness which form the dual durometer rubrail 100.

Figure 1:
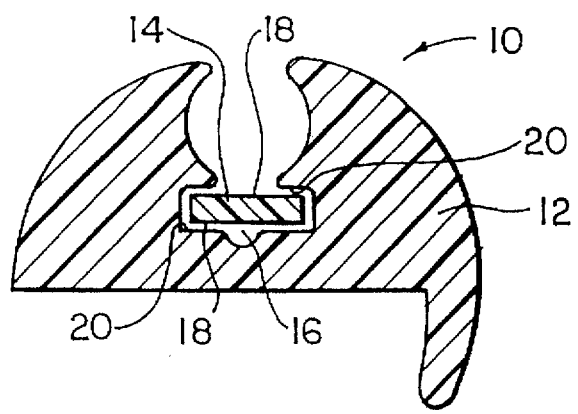
FIG. 1 is a cross-section view of a prior art single durometer rubrail having an inserted stiffener.
Figure 2:
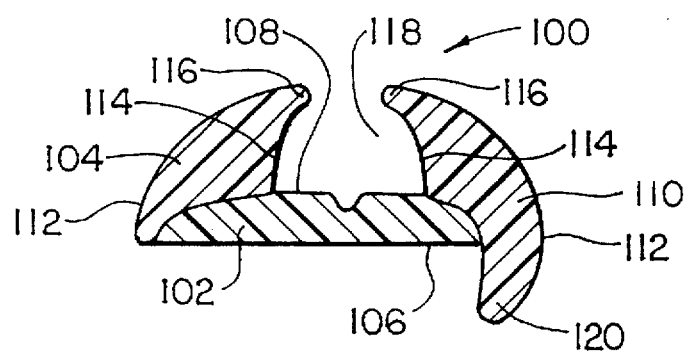
FIG. 2 is cross-section view of a dual durometer rubrail in accordance with the present invention.

In a first embodiment shown in FIG. 2, the rubrail base portion 102 includes a bottom surface 106 adapted for attachment to a boat gunwale (also known as a gunnel), and a top surface 108. The first body portion 104 is affixed to a portion of the base portion top surface 108 and includes a second body portion 110 affixed to a portion of the top surface in a spaced apart relationship with respect to the first bodyportion 104. The first and second body portions 104, 110 each include an arcuate second surface 112 and a concave third surface 114, wherein the second and third surface taper from the base portion top surface 108 to a rounded edge 116. The first and second body portions 104,110 form an elongated cavity 118 wherein an insert or rope may be placed. The cavity 118 also provides an area that portions of the first and second body portions 104,110 may flex within, in response to an impact to the rubrail 100. In the exemplary embodiment, a part of the second body portion 110 extends beyond the bottom surface 106 forming a leg 120 adapted for resting on a portion of gunwale (not shown). A rubrail without a leg is contemplated to be within the scope of the appended claims.

The base portion 102 is of first hardness and the first and second body portions 104,110 are of a second hardness. In an exemplary embodiment, the first hardness of the base portion 102 is greater than the second hardness of the first and second body portions 104,110. The first and second body portions 104,110 are formed from a relatively flexible plastic such as Teknor Apex number 88N059C having a durometer of about Shore A 84. The base portion 102 is formed from a relatively stiff plastic such as Lynn Plastics number 5-99D-A having a durometer of about Shore A 99, or a stiffer material such as Geon number 8700A. Of course other suitable materials, of other hardnesses, may be used as known to one skilled in the art. Also, a rubrail having a base portion harder than the first and second base portions is contemplated, as well as the second body portion having a third hardness that may be less than, greater than, or equal to the hardness of the base portion or the first body portion.

Figure 3:
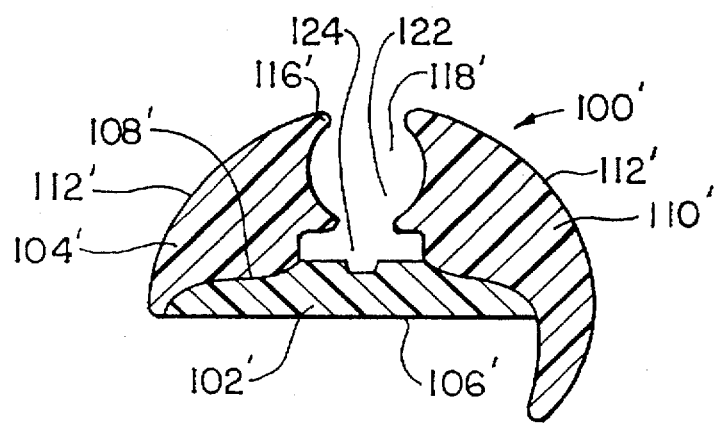
FIG. 3 is a cross-section view of an alternative embodiment of the rubrail of FIG. 2.

FIG. 3 illustrates an alternative configuration for a rubrail 100' wherein first and second body portions 104', 110' second surfaces 112' form a cavity 118' having an annular portion 122 and a substantially rectangular portion 124. A rope (not shown) may be disposed in the cavity annular portion 122 for functional or aesthetic purposes. The cavity rectangular portion 124 provides a higher profile rubrail 100' affording additional space in which the first and second body portions 104',110' may flex in response to an impact.

Figure 4A:
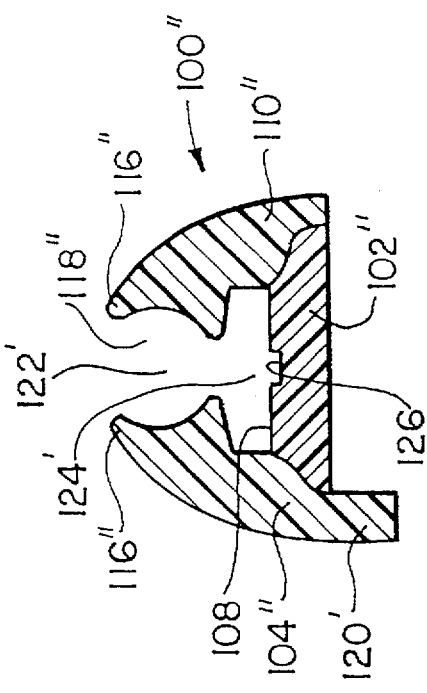
FIG. 4A is a cross-section view of a further alternative embodiment of the rubrail of FIG. 2.
Figure 4B:
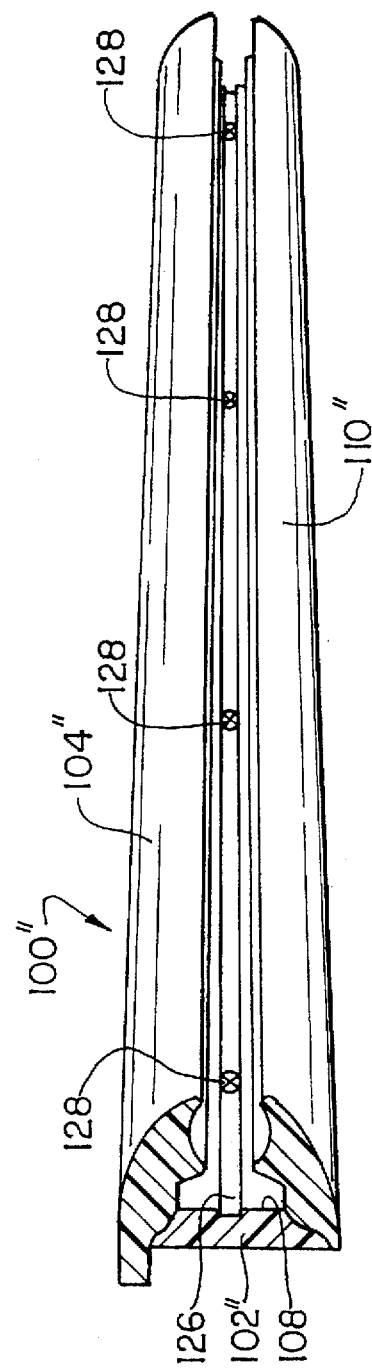
FIG. 4B is a top perspective view of the rubrail of FIG. 4A.

FIGS. 4A and 4B show another embodiment of a rubrail 100" including a cavity 118" having a annular portion 122' and a substantially rectangular portion 124'. The first body portion 104" includes a leg 120' adapted for complimenting the top or bottom of a gunwale and positioning thereon. The base portion 102" further includes a channel 126 extending longitudinally and substantially parallel to the first and second body portions 104",110". At fixed intervals, the rubrail 100" is attached to a boat hull by fastener means 128 such as screws, bolts, rivets, or other means known in the art. The channel 126 allows the fastener means to be recessed or flush with the base portion top surface 108". The relatively stiff base portion 102" distributes the load of the fastener means 128. Thus, the more flexible first and second body portions 104",110" are not subject to fastener pressure, and do not have a wavy appearance, or exhibit bulging. The base portion 102" conforms to the contour of a gunwale, and is resistant to bending in other directions providing a rubrail that affords protection and consistently smooth surfaces.

Figure 5A:
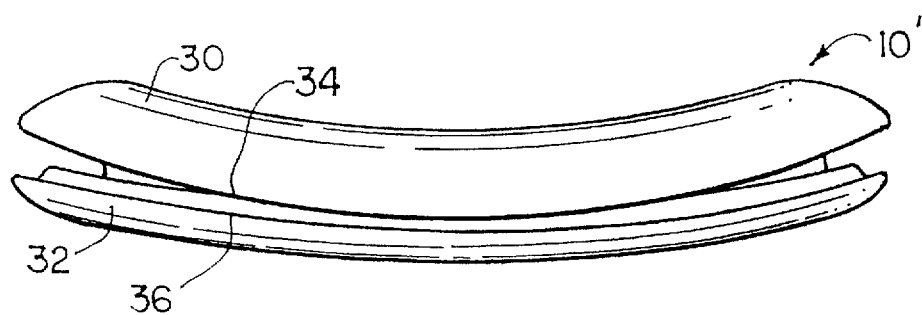
FIG. 5A is a perspective view of a prior art single durometer flexible rubrail shown bent in a first direction.
Figure 5B:
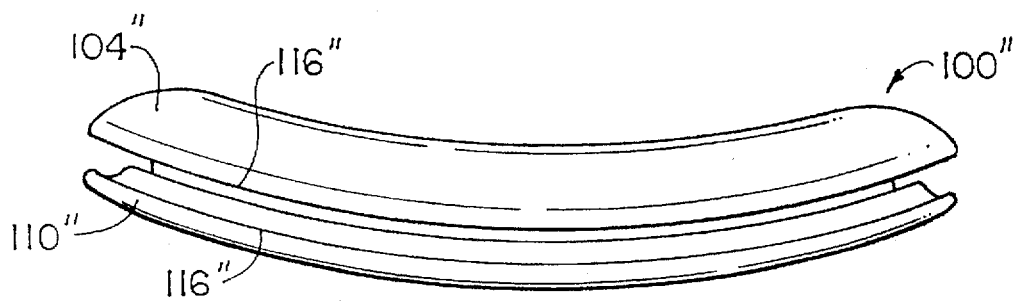
FIG. 5B is a perspective view of the dual durometer rubrail of FIG. 4A shown bent in a first direction.
Figure 5C:
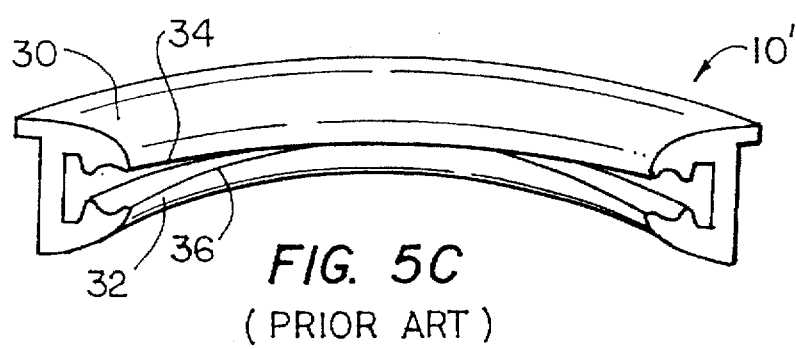
FIG. 5C is a perspective view of the prior art single durometer flexible rubrail of FIG. 5A shown bent in a second direction.

FIGS. 5A and 5C illustrate a prior art single durometer flexible rubrail 10' having first and second portions 30,32. In FIG. 5A, the rubrail 10' is shown bent in a first direction which causes edges 34,36 of the first and second portions 30,32 to merge. The original spaced apart relationship, wherein the edges 34,36 are at a fixed distance, is disturbed by bending the rubrail 10'. FIG. 5C shows the prior art rubrail 10' of FIG. 5A bent in a second direction. As can be seen, the single durometer rubrail edges 34,36 pucker, destroying the original spaced apart relationship thereof.

Figure 5D:
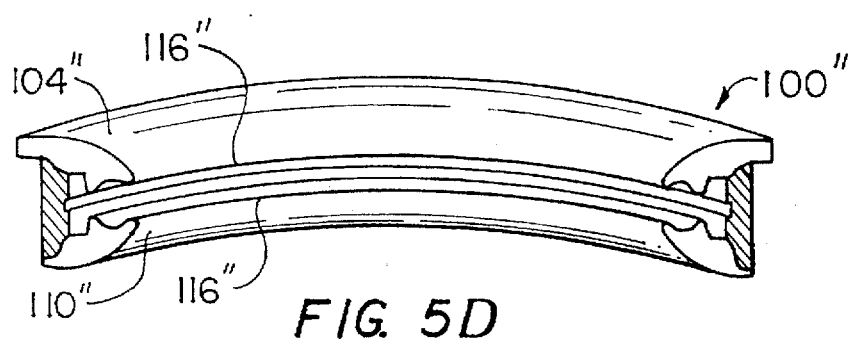
FIG. 5D is a perspective view of the dual durometer rubrail of FIG. 4A shown bent in a second direction.

By contrast, and illustrated in FIGS. 5B and 5D, the dual durometer rubrail 100" of FIG. 4A is not affected by bending. More particularly, the fixed spacing of the first and second body portion edges 116" remains intact in the presence of bending of the rubrail, as shown in FIG. 5B. FIG. 5D illustrates the rubrail 100" of FIG. 4A bent, but maintaining a constant distance between the first and second body portion edges 116".

Figure 6:
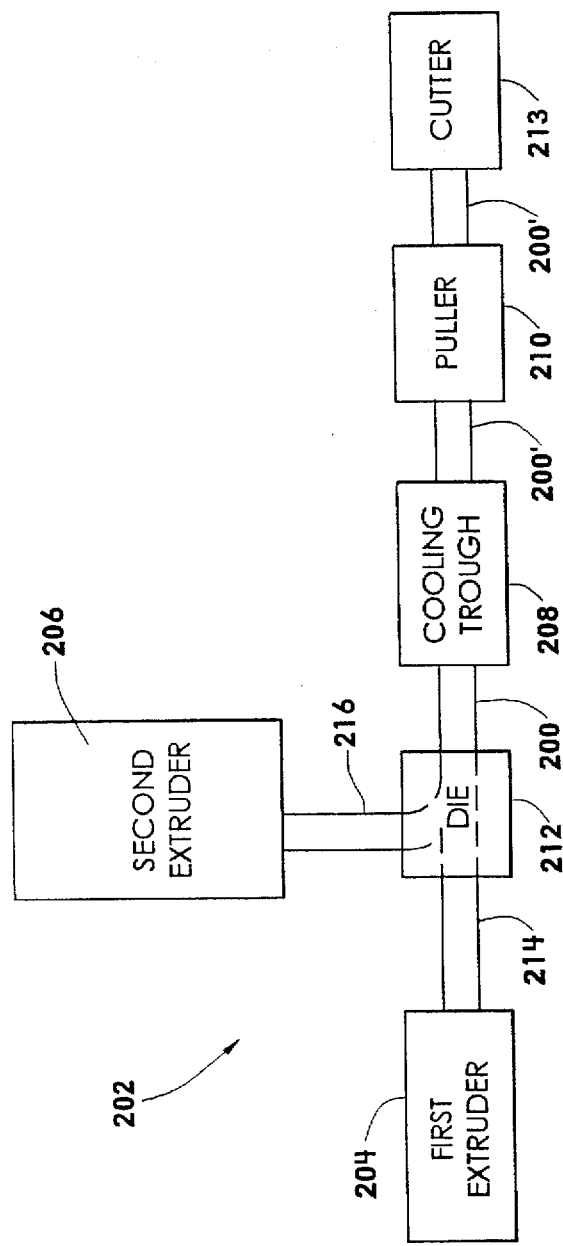
FIG. 6 is a block diagram illustrating exemplary manufacturing apparatus for fabricating the rubrail of FIG. 2.

FIG. 6 is a block diagram illustrating the manufacturing apparatus used in fabricating dual durometer rubrail according to the present invention. FIG. 6 diagrammatically illustrates an extruding apparatus used to manufacture dual durometer rubrail 200 according to the present invention. An extruding system 202 includes a first extruder 204 and a second extruder 206. The extruding system 202 extrudes the dual durometer rubrail 200 into a desired configuration.

In an exemplary embodiment, the extruding system 202 further includes a cooling trough 208, a puller 210, and a die 212 having a configuration conforming to the geometry of the rubrail 200. The first extruder 204 contains a first plastic material of which rubrail first and second body portions are formed. The first extruder 204 includes a barrel 214 having a diameter of about three and one-half inches through which the melted first plastic material is forced by a first screw. The second extruder 206 contains a second plastic material, and includes a barrel 216 having a diameter of about two inches and a second screw. The first and second plastic materials are heated to a molten state in a temperature range from 340° to 370° F. The temperature of the first and second plastic materials is monitored and precisely maintained. The first and second extruders 204,206 extrude respective first and second plastic materials into the die 212 from which the dual durometer rubrail 200 is extruded. The first and second plastic materials converge while in a molten state so that the materials are fused at the point of contact. After exiting the die 212, the extruded rubrail is immersed in a cool liquid, water for example, contained in the trough 208 to solidify the rubrail shape. A puller 210 pulls the extruded rubrail 200 away from the die 212 at a precise rate of speed such that a draw-down of proper ratio is achieved. The speed is precisely maintained to ensure that the extruded rubrail has the desired dimensions. The cooled rubrail 200' is then cut to a desired length by a cutter 218.

Having described the preferred embodiments of the invention, those skilled in the art will realize that many variations are possible. For example, other plastics having different durometer values than those disclosed herein may be used without departing from the spirit of the invention. Further, materials other than plastic, but having the desired properties or effect may be used. Modifications in the manufacturing apparatus, such as the extruder barrel size are also possible. Other alternative configurations of the illustrated embodiments may also be made but remain within the scope of the claims.

What is claimed is:

1. An integral, coextruded rubrail comprising:

a base portion extending longitudinally including a bottom surface and a top surface, said base portion having a first hardness;

a first body portion and a second body portion, each having a second hardness, said first and second body portions including a first surface affixed to a portion of said base portion, an arcuate second surface, and a concave third surface, wherein said second and third surfaces arcuately taper from said first surface to an edge wherein a cavity is formed for allowing said first and second body portions to flex in response to an impact;

said cavity formed by said first and second body portion third surfaces defining a partial annular region and a substantially rectangular region.

2. The rubrail according to claim 1, wherein said first body portion extends to a point beyond a plane defined by said base portion bottom surface to form a leg.

3. The rubrail according to claim 1, wherein said top surface defines a channel extending longitudinally adapted for allowing attachment means to be flush with said top surface after attachment of said rubrail to said gunwale.

4. The rubrail according to claim 1, wherein said first and second body portion edges retain said spaced apart relationship while said rubrail is bent.

5. A method for forming an integral dual durometer rubrail comprising the steps of:

melting a first plastic material having a first hardness into a molten state;

melting a second plastic material having a second hardness into a molten state;

merging said first and second materials while in the molten state, wherein said first and second materials are fused together;

extruding said first and second plastic materials through a die so as to form an integral co-extruded rubrail;

immersing said rubrail in a chilled fluid; and pulling said chilled rubrail through said chilled fluid at a constant speed.

6. The method according to claim 5, wherein said step of melting said first plastic material having a first hardness into a molten state and said step of melting said second plastic material having a second hardness into a molten state, further includes the step of monitoring the temperature of said first and second materials in the molten state to maintain said temperature in the range from 340° to 370° F.

7. The method according to claim 5, wherein the step of extruding said first and second materials further includes the step of shaping said extruded rubrail.

8. The method according to claim 5, wherein said method further includes the step of cutting said rubrail.

* * * * *